(12) United States Patent
Zhao et al.

(10) Patent No.: US 9,630,870 B2
(45) Date of Patent: Apr. 25, 2017

(54) METHOD FOR MANUFACTURING COLUMNAR CURVED TEMPERED GLASS

(75) Inventors: Yan Zhao, Henan (CN); Kezhi Zhang, Henan (CN)

(73) Assignee: LUOYANG LANDGLASS TECHNOLOGY CO., LTD, Henan (CN)

( * ) Notice: Subject to any disclaimer, the term of this patent is extended or adjusted under 35 U.S.C. 154(b) by 0 days.

(21) Appl. No.: 14/386,618

(22) PCT Filed: Jul. 12, 2012

(86) PCT No.: PCT/CN2012/078541
§ 371 (c)(1),
(2), (4) Date: Oct. 30, 2014

(87) PCT Pub. No.: WO2013/143239
PCT Pub. Date: Oct. 3, 2013

(65) Prior Publication Data
US 2015/0047395 A1  Feb. 19, 2015

(30) Foreign Application Priority Data
Mar. 31, 2012  (CN) .......................... 2012 1 0094827

(51) Int. Cl.
*C03B 23/033* (2006.01)
*C03B 27/044* (2006.01)
(Continued)

(52) U.S. Cl.
CPC ........ *C03B 23/033* (2013.01); *C03B 27/0447* (2013.01); *C03B 35/166* (2013.01); *C03B 35/187* (2013.01); *C03B 35/189* (2013.01)

(58) Field of Classification Search
CPC .............. C03B 23/033; C03B 27/0445; C03B 27/0447; C03B 35/187
See application file for complete search history.

(56) References Cited

U.S. PATENT DOCUMENTS 4,430,110 A * 2/1984 Frank .................. C03B 23/0302
65/104
4,842,634 A * 6/1989 Vanaschen ............ C03B 23/035
65/106
(Continued)

FOREIGN PATENT DOCUMENTS

| CN | 1526667 A | 9/2004 |
| CN | 2651247 Y | 10/2004 |
| WO | 2005047198 A1 | 5/2005 |

*Primary Examiner* — Jason L Lazorcik
(74) *Attorney, Agent, or Firm* — AKC Patents, LLC; Aliki K. Collins

(57) ABSTRACT

The present invention discloses a method for processing a columnar curved tempered glass. The method specifically comprises the following steps. Bending and tempering of the high temperature flat glass are divided into two stations. Bending is firstly carried out on the high temperature flat glass output by a heating furnace; the columnar extending direction of the curved glass is perpendicular to the direction the glass output from the heating furnace in the bending process, and then the formed curved glass is output to a tempering station in the columnar extending direction thereof to undergo tempering. In the present invention, bending and tempering of the high temperature flat glass are completed by two stations to break the normal procedure that bending and tempering are carried out by a single bending device intensively, thereby providing a novel technological approach for processing the columnar curved tempered glass.

6 Claims, 7 Drawing Sheets

(51) Int. Cl.
*C03B 35/16* (2006.01)
*C03B 35/18* (2006.01)

(56) References Cited

U.S. PATENT DOCUMENTS

| | | | | |
|---|---|---|---|---|
| 5,059,233 | A * | 10/1991 | Miihkinen | C03B 23/0258 65/104 |
| 5,286,271 | A * | 2/1994 | Rueter | C03B 23/03 65/104 |
| 5,320,661 | A * | 6/1994 | Fecik | C03B 23/0302 65/104 |
| 5,397,647 | A * | 3/1995 | Kramling | B32B 17/10981 219/203 |
| 5,833,729 | A * | 11/1998 | Meunier | C03B 23/0305 65/104 |
| 5,858,047 | A * | 1/1999 | Frank | C03B 23/03 65/104 |
| 5,992,180 | A * | 11/1999 | Tsuchiya | C03B 23/0252 198/463.2 |
| 6,035,666 | A * | 3/2000 | Zalesak | C03B 23/0254 65/245 |
| 6,582,799 | B1 * | 6/2003 | Brown | B32B 17/10036 296/190.1 |
| 6,869,644 | B2 * | 3/2005 | Buhay | B32B 17/10036 427/376.2 |
| 6,916,542 | B2 * | 7/2005 | Buhay | B32B 17/10036 428/428 |
| 6,962,759 | B2 * | 11/2005 | Buhay | B32B 17/00 428/428 |
| 7,155,937 | B2 * | 1/2007 | Garnier | C03B 35/202 65/104 |
| 8,197,892 | B2 * | 6/2012 | Finley | B32B 17/00 427/163.1 |
| 8,790,796 | B2 * | 7/2014 | Buhay | B32B 17/10036 428/336 |
| 2006/0254317 | A1 * | 11/2006 | Serrano | C03B 23/033 65/291 |
| 2006/0288737 | A1 * | 12/2006 | Sayahi | C03B 23/033 65/106 |
| 2007/0084245 | A1 * | 4/2007 | Leclercq | B65G 49/067 65/106 |
| 2008/0260999 | A1 * | 10/2008 | Serrano | C03B 27/0404 428/174 |
| 2009/0197048 | A1 * | 8/2009 | Amin | C03C 3/085 428/142 |
| 2009/0229309 | A1 * | 9/2009 | Nomura | C03B 23/0254 65/106 |
| 2010/0186452 | A1 | 7/2010 | Harjunen et al. | |
| 2010/0246016 | A1 * | 9/2010 | Carlson | C03C 15/00 359/599 |
| 2012/0052302 | A1 * | 3/2012 | Matusick | C03C 15/00 428/410 |
| 2013/0273324 | A1 * | 10/2013 | Moll | C03C 23/0025 428/161 |

* cited by examiner

METHOD FOR MANUFACTURING COLUMNAR CURVED TEMPERED GLASS

TECHNICAL FIELD

The present invention relates to a method used for manufacturing columnar curved tempered glass.

BACKGROUND ART

The columnar curved tempered glass used in reality comprises two kinds, one is the equal arc columnar curved tempered glass as shown in FIG. 1, namely, the columnar curved tempered glass with cross section of circular arc; and the other one is the unequal arc columnar curved tempered glass as shown in FIGS. 2 (a, b, c and d), namely, the columnar curved tempered glass with cross section curve comprising a plurality of arc segments having different curvatures and/or straight segments.

A roller type bending device is usually used for manufacturing the equal arc columnar curved tempered glass. Such bending device comprises a roller type bending mechanism and a chiller cooling mechanism, and the rollers in the rollers bending mechanism are positioned between the upper and lower chillers in the chiller cooling mechanism. The roller type bending mechanism is divided into two kinds according to the operating mode, one is shown in FIG. 3 and FIG. 4, namely, the arrangement of each supporting roller in the rollers supporting high temperature flat glass is changed from planar arrangement in space into curved arrangement corresponding to the shape of the glass to be formed, so as to enable the glass to undergo bending deformation. Such bending mechanism is called as the first mechanism below. FIG. 3 is a schematic diagram showing the bending mechanism before deformation; FIG. 4 is a schematic diagram showing the bending mechanism after deformation. In the figures, 1 represents for a supporting roller; 2 represents for a glass plate and 3 represents for chillers. The other one is shown in FIG. 5, FIG. 6 and FIG. 7. The axis of each supporting roller in the rollers supporting the high temperature flat glass bends itself so as to enable the supported glass to undergo bending deformation. Such bending mechanism is called as the second mechanism below. FIG. 5 is a side view showing the bending mechanism before deformation; FIG. 6 is an end face view showing the bending mechanism before deformation; FIG. 7 is a schematic diagram showing the bending mechanism after deformation. The supporting roller with flexional axis in the figures can be constituted by a soft supporting roller, or constituted by combining a plurality of spaced rollers through a connecting device (not shown in the figures).

In a manufacturing process, firstly, the flat glass is fed into a heating furnace and heated, and then the heated high temperature flat glass 2 is fed into the bending device for bending and tempering. After the high temperature flat glass is fed to the rollers of the bending mechanism in the bending device, the high temperature flat glass undergoes bending and then tempering through a cooling mechanism. In the cooling tempering process, in order to ensure that the upper and lower surfaces of the glass and each position of the same surface have the same tempering effect as much as possible, the chillers in the tempering mechanism are arranged according to the corresponding shape of the curved glass subjected to bending to ensure uniform distance between each chiller and the glass surface, simultaneously, the supporting roller or the supporting unit needs to be continually rotated back and forth to swing the glass, thereby avoiding the influence of the supporting roller or the supporting unit on the tempering on the lower surface of the glass. Finally, for the first bending mechanism after the glass plate is tempered, the finished product of the curved glass is output by the rollers after each supporting roller is reset to be horizontally positioned; and for the second bending mechanism, the finished product of the curved glass is output by the rollers directly.

For the first bending mechanism, the curved glass subjected to bending swings perpendicular to the axis of the supporting roller in the tempering process, the swinging curved glass always keeps mutually parallel to the supporting roller and the chiller arrays positioned above and under the supporting roller when the equal arc curved glass is processed; and the swinging curved glass is not parallel to the rollers and the chiller array when the unequal arc curved glass is processed, so that the precise bending of the curved glass is affected, as well as the swinging curved glass will collide with the chiller thereabove and is crushed, and only the second bending mechanism can be used for processing the unequal arc columnar curved tempered glass.

When the unequal arc columnar curved tempered glass is processed by using the second bending mechanism, though the problem that the curved glass collides with the chiller array thereabove while it undergoes tempering and swinging is avoided, obvious wavy deformation always exists at both sides of the formed curved glass adjacent to each supporting roller due to the fact that the high temperature flat glass is driven by a plurality of the supporting rollers arranged between the rollers at intervals to complete the deformation of the glass, so it is difficult to meet high quality requirement of the curved glass article. Certainly, wavy deformation also exists at both sides of the curved glass adjacent to each supporting roller while the equal arc curved tempered glass is processed by the second bending mechanism.

Moreover, as the front and back ends of the high temperature flat glass depart from the glass heating furnace at different time and have different outside cooling time, temperature gradient exists from the front end to the back end of the high temperature flat glass while the high temperature flat glass has entered the bending mechanism. The front end of the glass has lower temperature than that of the back end, and the larger the size of the glass in the forward and backward direction, the higher the temperature gradient in the forward and backward direction, whereas the temperature before the glass is bent directly relates to the result of bending. Compared with the front end with low temperature, the back end with high temperature is easier to bend, so that the curved tempered glass subjected to bending has a bit smaller curvature near the front end than that near the back end, and the quality of the curved tempered glass is also affected.

INVENTION CONTENTS

Aiming at the problem in the prior art, the present invention provides a novel method for processing a columnar curved tempered glass, and the bending quality of the columnar curved tempered glass manufactured by using the method can be improved.

In order to fulfill the aforementioned purpose, the present invention provides a method for processing columnar curved tempered glass. The method is specifically that bending and tempering of the high temperature flat glass are divided into two stations. Bending is firstly carried out on the high temperature flat glass output by a heating furnace. The columnar extending direction of the curved glass is perpendicular to the output direction of the glass from the heating furnace in the bending process, and then the formed curved glass is output to a tempering station in the columnar extending direction thereof to carry out tempering, wherein the relative vertical position of each supporting roller of the glass supporting the rollers in the bending mechanism at the bending station is adjustable, and the supporting rollers are arranged in a curve corresponding to the shape of the glass to be formed so as to enable the supported glass to undergo bending deformation.

Further, a precise bending station is further interposed between the bending station and the tempering station, and the curved glass output by the bending station is transferred to the tempering station for tempering after precise bending treatment.

Further, a passing-through type treatment mode is adopted to treat the curved glass at the precise bending station, namely, the curved glass is subjected to a precise bending treatment once passes through the station.

Further, a passing-through type treatment mode is adopted to treat the curved glass at the tempering station, namely, the curved glass starts to tempering once the curved glass enters the tempering station, and tempering is completed as the curved glass passes through the tempering station.

Further, a passing-through type treatment mode is adopted to treat the high temperature flat glass at the bending station, namely, the high temperature flat glass begins bending deformation during entering the glass bending station, and bending is completed when all the high temperature flat glass has entered the bending station.

In the present invention, bending and tempering of the high temperature flat glass are completed by two stations to break the normal procedure that bending and tempering are carried out in a single bending device intensively, and the formed curved glass is output to a tempering station in the columnar extending direction thereof, therefore the curved glass is transferred from the bending station to the tempering station smoothly. The method is not only used for manufacturing equal arc columnar curved tempered glass products, but also provides a novel technological approach for manufacturing unequal arc columnar curved tempered glass.

In the present invention, especially the high temperature flat glass begins bending deformation when the front end thereof enters the bending station, so that the thermal consistency is ensured while bending is carried out on the glass in the span range thereof, and the bending quality of the glass is further improved.

The precise bending station is added in the present invention, and the formed glass is tempered by adopting the passing-through type tempering treatment mode, therefore the bending quality of the curved glass and the quality of tempering treatment are further ensured.

In the figures: 1—supporting roller, 2—glass, 3—chiller, 4—auxiliary compression roller, 5—transferring scroll wheel, 6—loading table, 7—heating furnace, 8—glass bending station, 9—tempering station, 10—unloading table, and 11—precise bending station.

DETAILED DESCRIPTION

Hereinafter, the present invention will be explained in detail with the accompanying figures.

Embodiment 1

Figure 1:
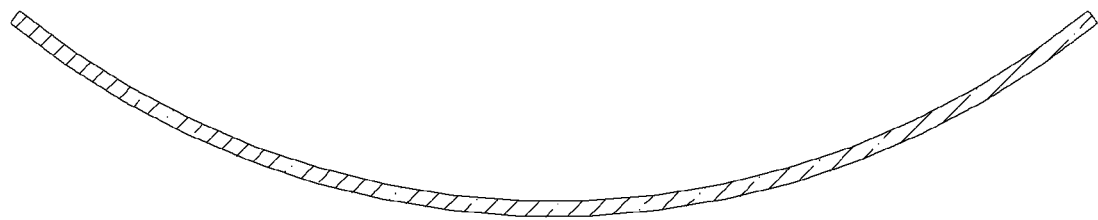
FIG. 1 is a schematic diagram of the cross section of equal arc columnar-curved tempered glass.
Figure 2:
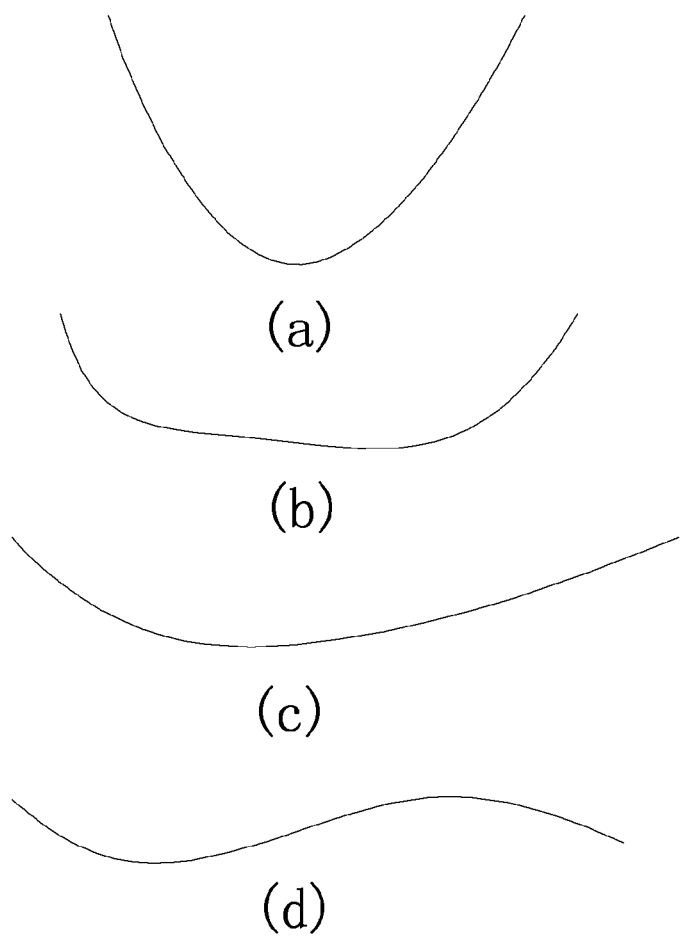
FIG. 2(a)-2(d) are schematic diagrams of cross sections of 4 kinds of unequal arc columnar-curved tempered glass.
Figure 3:
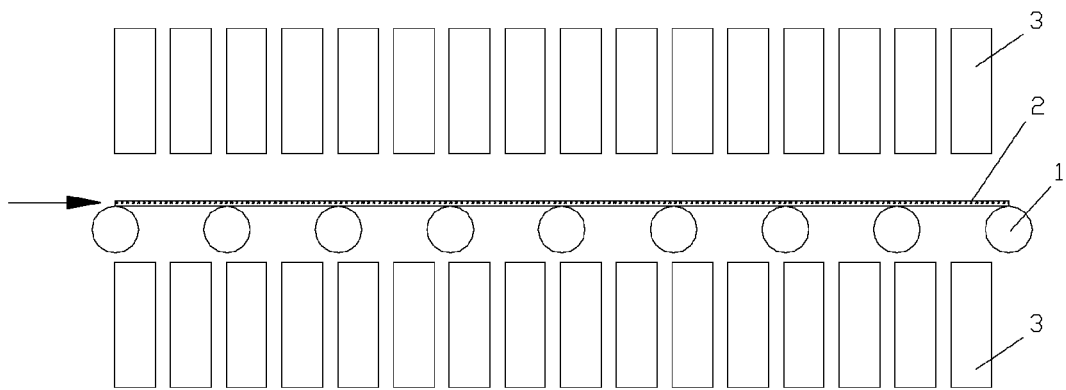
FIG. 3 is a schematic diagram showing the state before the deformation of the existing first glass bending mechanism.
Figure 4:
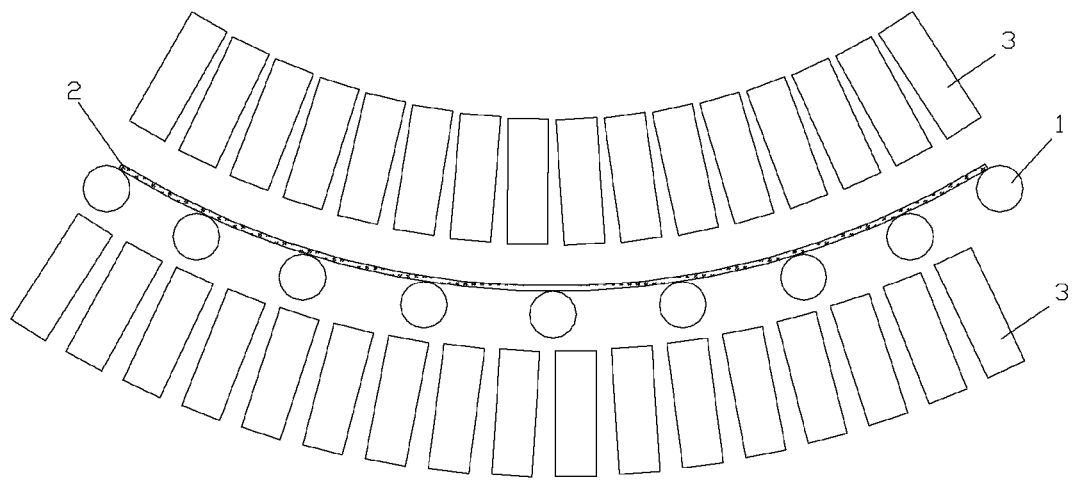
FIG. 4 is a schematic diagram showing the state after the deformation of the bending mechanism in FIG. 3.
Figure 5:
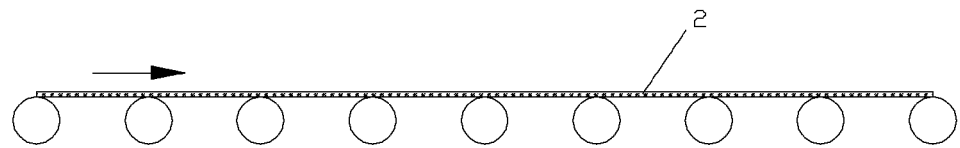
FIG. 5 is a schematic diagram showing the state before the deformation of the existing second glass bending mechanism.
Figure 6:
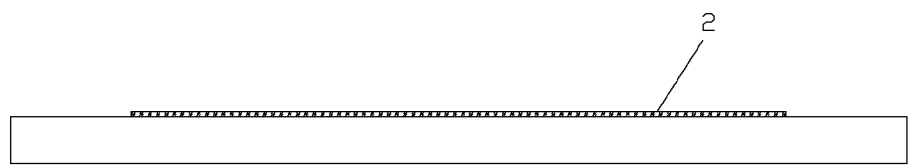
FIG. 6 is a side view of the glass bending mechanism in FIG. 5.
Figure 7:
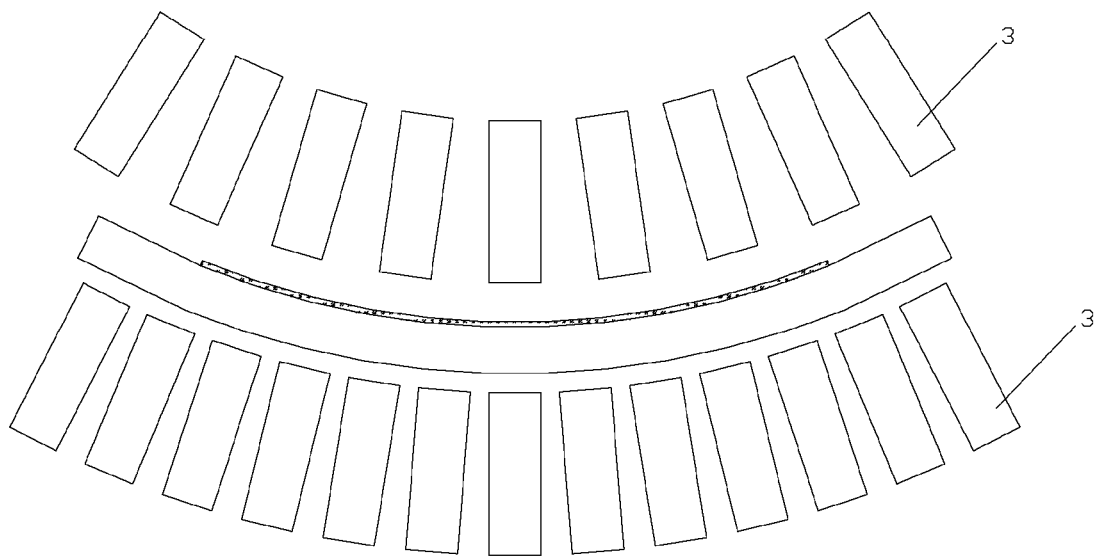
FIG. 7 is a schematic diagram showing the state after the deformation of the glass bending mechanism in FIG. 5.
Figure 8:
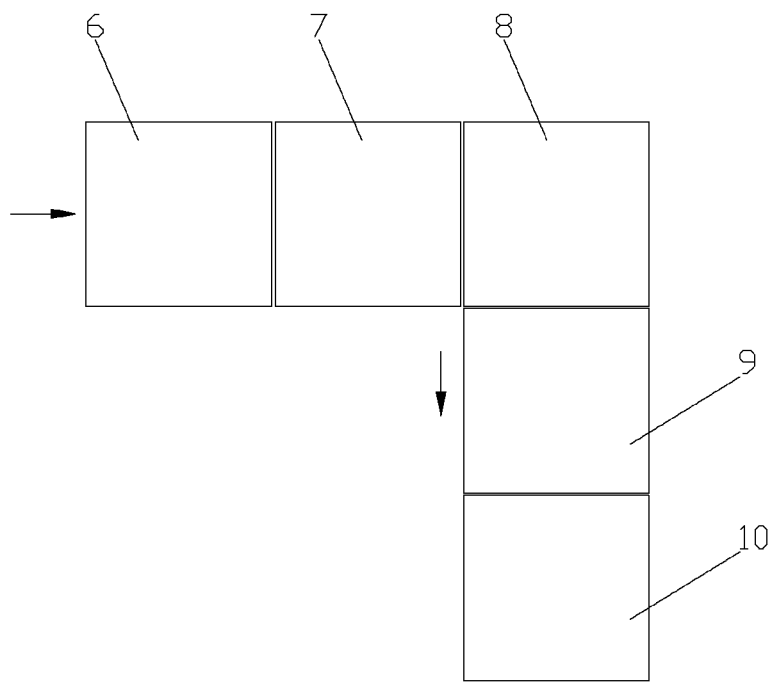
FIG. 8 is a schematic diagram showing the arrangement state of each station in the embodiment 1 of the method of the present invention.
Figure 9:
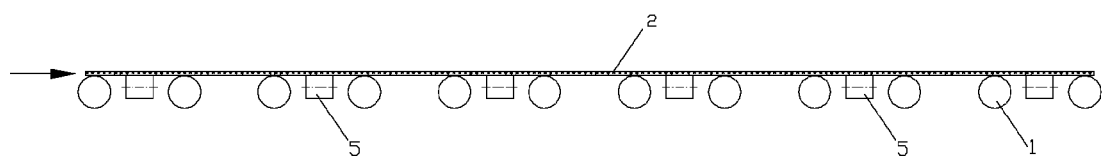
FIG. 9 is a state schematic diagram when the high temperature flat glass is transferred to a bending mechanism in the method of the present invention.
Figure 10:
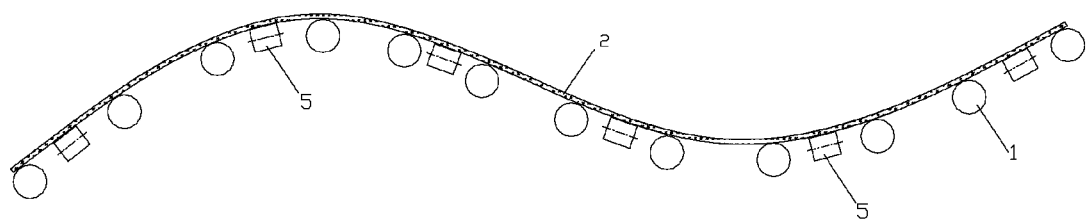
FIG. 10 is a state schematic diagram when the high temperature flat glass is subjected to bending in FIG. 9.

Each station is arranged as shown in FIG. 8 while the method of the present invention is implemented, wherein an loading table 6, a heating furnace 7, a glass bending station 8, a tempering station 9 and a unloading table 10 connected sequentially are arranged. The direction the curved glass formed by the glass bending station is output from the bending station 8 to the tempering station 9 is perpendicular to the direction the high temperature flat glass output from the heating furnace 7.

The aforementioned first bending mechanism is adopted to the glass bending mechanism of the bending station 8, namely, the arrangement of each supporting roller in the rollers supporting the high temperature flat glass is changed from planar arrangement in space into curved arrangement corresponding to the shape of the glass to be formed, so as to enable the glass to undergo bending deformation, and a transferring scroll wheel 5 is arranged between the adjacent supporting rollers 1. The cooling bending mechanism on the tempering station 9 is formed by the chiller 3 and the rollers transferring glass between the upper and lower chiller.

While the columnar curved tempered glass is processed, as shown in FIG. 9, FIG. 10, FIG. 11 and FIG. 12, firstly, the high temperature flat glass 2 heated by the heating furnace 7 is transferred to the bending station 8 for bending and then the curved glass is output by the transferring scroll wheel 5 in the bending mechanism of the bending station 8 to the tempering station 9 in the columnar extending direction of the curved glass, so as to undergo tempering. Finally, the finished product of the columnar curved tempered glass is extracted from the unloading table 10. Of cause, the transferring scroll wheel 5 in the bending mechanism can be formed by conveying mechanisms of other types, such as belt type conveying mechanism.

Figure 12:
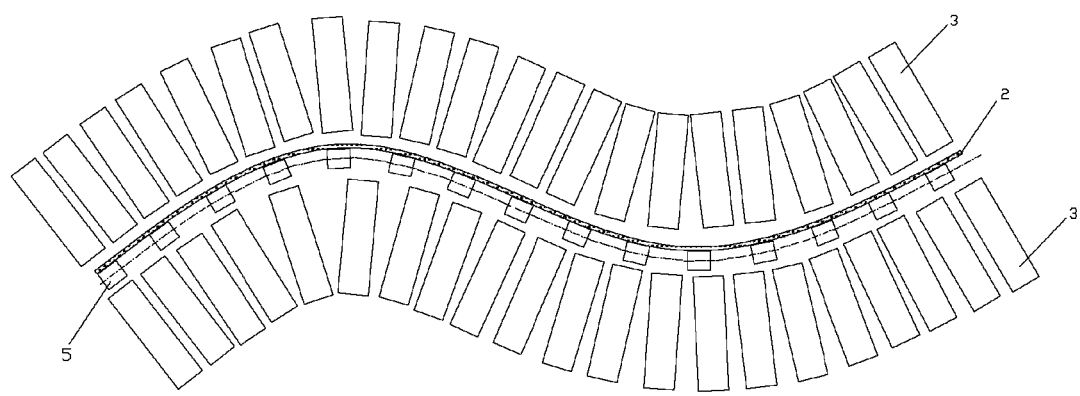
FIG. 12 is a schematic diagram showing the working state while the curved glass subjected to bending suffers tempering.
Figure 13:
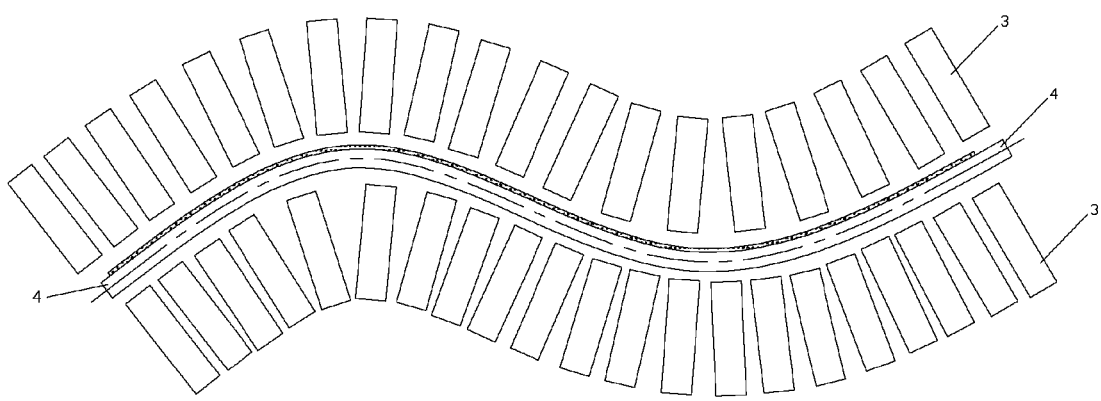
FIG. 13 is a schematic diagram showing the working state of another structure of the tempering mechanism.

The rollgang in the tempering mechanism of the tempering station 9 in FIG. 12 is constituted by the transferring scroll wheel 5; however, the rollgang can also be constituted by a soft supporting roller as shown in FIG. 13.

It remains to be explained that the curved glass manufactured in the example is unequal arc columnar curved tempered glass, naturally, by adopting the method of the present invention, equal arc columnar curved tempered glass can also be manufactured.

Embodiment 2

Figure 14:
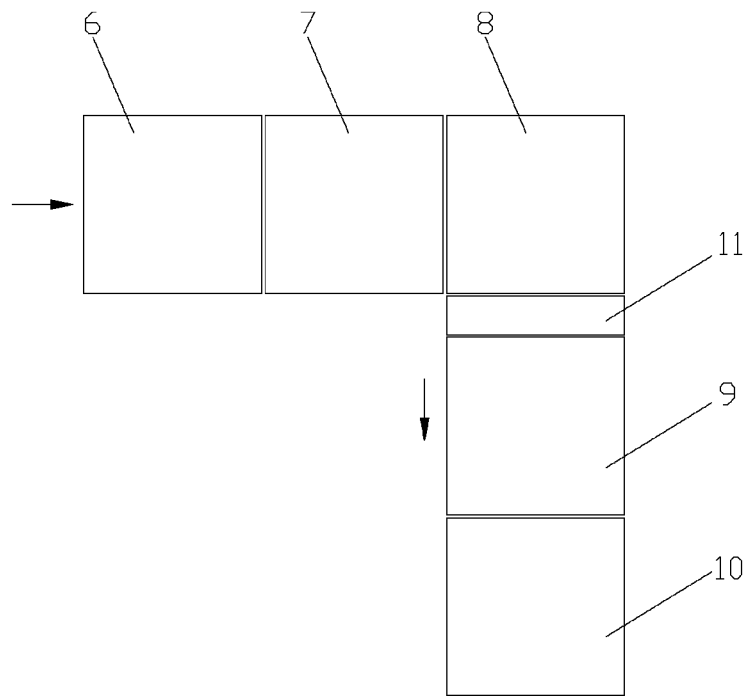
FIG. 14 is a schematic diagram showing the arrangement state of each station in the embodiment 2 of the method of the present invention.
Figure 15:
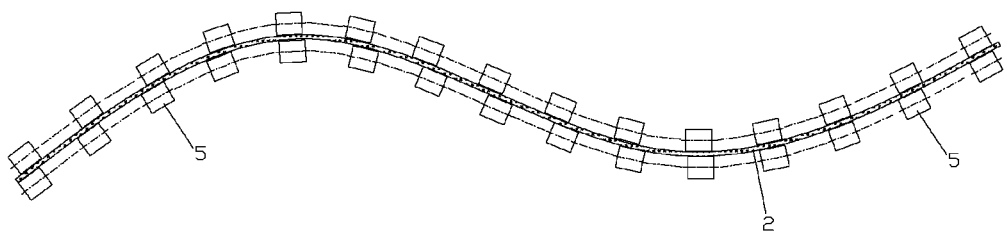
FIG. 15 is a first structural schematic diagram of the mechanism adopted by the precise bending station.
Figure 16:
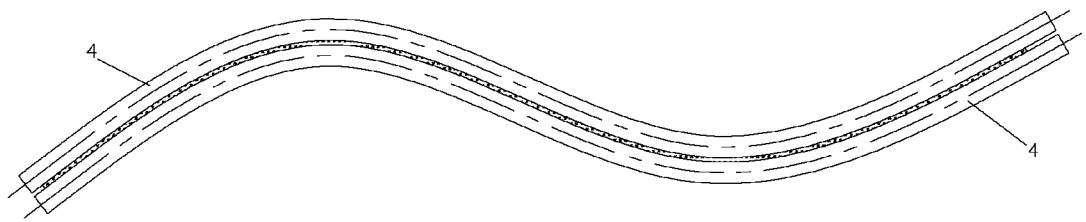
FIG. 16 is a second structural schematic diagram of the mechanism adopted by the precise bending station.

As shown in FIG. 14, a precise bending station 11 can also be arranged between the bending station 8 and the tempering station 9 in order to improve the bending accuracy of the columnar curved tempered glass, in this way, the curved glass formed by the bending station 8 is subjected to precise bending by the precise bending station 11 and then transferred into the tempering station 9.

As shown in FIG. 13 or FIG. 14, the transferring scroll wheel 5 or the soft supporting roller for clamping the upper and lower surfaces of the curved glass simultaneously and transferring the curved glass forward simultaneously is arranged in the precise bending mechanism of the precise bending station 11. The scroll wheel or the supporting roller in the precise bending mechanism is arranged according to the predetermined shape of the curved glass, and further precise bending of the curved glass basically formed upstream is just completed.

In the aforementioned examples, the tempering mechanism on the tempering station 9 can be on line before the curved glass is input, in this way, the curved glass begins to undergo tempering during entering, and tempering is completed as long as passing through the tempering station 9, thereby realizing passing-through type tempering of the curved glass. And tempering treatment can also be carried on the curved glass after all the curved glass to be treated has been transferred to the tempering mechanism. Besides the two operating modes, the tempering mechanism can also work in such a way, namely, the tempering mechanism is on line before the curved glass is input, then the curved glass begins to undergo tempering during entering, then the tempering mechanism swings as well as suffers tempering until tempering is completed after all the glass has entered.

Figure 11:
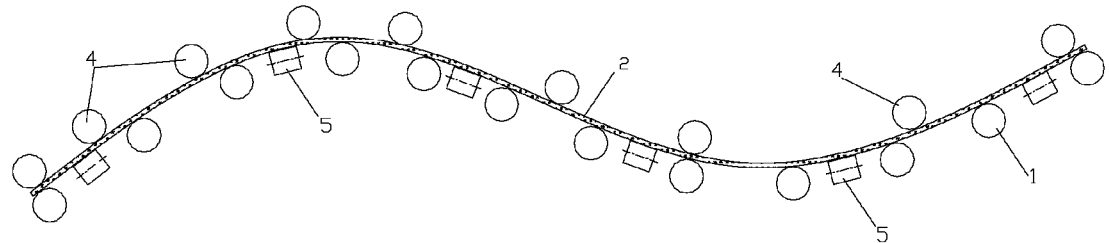
FIG. 11 is a structure diagram of the glass bending mechanism with auxiliary rollers used while a passing-through type bending mode is adopted in the method of the present invention.

Bending can be carried on the high temperature flat glass by the bending mechanism on the bending station 8 in the aforementioned example when all the high temperature flat glass has entered. As well as shown in FIG. 11, the glass bending mechanism is preset as the state corresponding to the shape of the curved glass to be formed, in this way, the high temperature flat glass suffers bending once enters the bending mechanism, thereby realizing passing-through type bending of the high temperature flat glass.

When the bending of the glass is carried out in a passing-through type bending mode, preferably, a plurality of auxiliary compression rollers 4 are arranged above the glass supporting roller in parallel in order to ensure that the high temperature glass is capable of entering the bending mechanism smoothly. By utilizing the cooperation of the auxiliary compression roller 4 and the bottom supporting roller 1, the high temperature glass is driven to feed the bending mechanism while suffering bending deformation, simultaneously, the auxiliary compression roller 4 also involves in the bending process of the high temperature glass to improve the bending quality of the curved glass.

It is to be understood that the present invention is not to be limited to the aforementioned description aiming at explaining the present invention and various equivalents without departing from the spirit of the present invention are within the scope of the present invention.

The invention claimed is:

1. A method for forming a curved tempered glass comprising:
   bending a previously heated flat glass in a bending station thereby forming a curved glass;
   tempering the curved glass in a tempering station, wherein the tempering station is separate from the bending station;
   wherein the flat glass is previously heated in a heating furnace and then is conveyed along a first direction out of the heating furnace and into the bending station;
   wherein the heated flat glass is subsequently bent in the bending station so that the curved glass extends along a second direction that is perpendicular to the first direction; and
   wherein the curved glass exits the bending station and enters the tempering station along the second direction; and
   wherein the heated flat glass is bent in the bending station via a bending mechanism that comprises glass supporting rollers and transferring scroll wheels and wherein each transferring scroll wheel is arranged between two adjacent glass supporting rollers.

2. The method of claim 1,
   wherein a relative vertical position of each glass supporting roller in the bending mechanism at the bending station is adjustable, and the glass supporting rollers are arranged in a curve corresponding to the shape of the curved glass to be formed.

3. The method according to claim 1, wherein an additional bending station is further interposed between the bending station and the tempering station.

4. The method according to claim 3, wherein a passing-through treatment mode is used to treat the curved glass at the additional bending station, namely the curved glass is subjected to an additional bending treatment while passing through the additional bending station.

5. The method according to claim 1, wherein a passing-through treatment mode is used to treat the curved glass at the tempering station, namely, the curved glass begins tempering during entering the tempering station, and tempering is completed as the curved glass passes through the tempering station.

6. The method according to claim 1, wherein a passing-through treatment mode is used to treat the previously heated flat glass at the bending station, namely, the previously heated flat glass begins bending during entering the glass bending station, and bending is completed when all the previously heated flat glass has entered the bending station.

* * * * *